United States Patent
Peltz et al.

(10) Patent No.: US 7,233,844 B2
(45) Date of Patent: Jun. 19, 2007

(54) LOCOMOTIVE REMOTE CONTROL SYSTEM WITH DIAGNOSTIC DISPLAY

(75) Inventors: David Michael Peltz, Melbourne, FL (US); Mark Bradshaw Kraeling, Melbourne, FL (US)

(73) Assignee: General Electric Company, Schenectady, NY (US)

( * ) Notice: Subject to any disclaimer, the term of this patent is extended or adjusted under 35 U.S.C. 154(b) by 165 days.

(21) Appl. No.: 11/086,830

(22) Filed: Mar. 22, 2005

(65) Prior Publication Data

US 2005/0205720 A1 Sep. 22, 2005

Related U.S. Application Data

(60) Provisional application No. 60/555,113, filed on Mar. 22, 2004.

(51) Int. Cl.
*B61L 3/00* (2006.01)
(52) U.S. Cl. .................. 701/19; 701/2; 701/33
(58) Field of Classification Search ............ None
See application file for complete search history.

(56) References Cited

U.S. PATENT DOCUMENTS

| | | | |
|---|---|---|---|
| 5,685,507 A | 11/1997 | Horst et al. | |
| 6,470,245 B1 | 10/2002 | Proulx | |
| 6,658,331 B2 | 12/2003 | Horst et al. | |
| 6,697,716 B2 | 2/2004 | Horst | |
| 6,853,890 B1 * | 2/2005 | Horst et al. | 701/20 |
| 6,959,235 B1 * | 10/2005 | Abdel-Malek et al. | 701/33 |
| 2002/0022984 A1 * | 2/2002 | Daniel et al. | 705/8 |
| 2003/0040853 A1 | 2/2003 | Brousseau et al. | |
| 2003/0182029 A1 | 9/2003 | Horst et al. | |
| 2004/0064223 A1 | 4/2004 | Horst et al. | |
| 2004/0090315 A1 | 5/2004 | Mackjust et al. | |
| 2004/0117076 A1 * | 6/2004 | Horst | 701/19 |
| 2004/0239268 A1 * | 12/2004 | Grubba et al. | 318/268 |

FOREIGN PATENT DOCUMENTS

WO  WO 01/30632 A1 * 5/2001

* cited by examiner

*Primary Examiner*—Michael J. Zanelli
(74) *Attorney, Agent, or Firm*—Carlos Luis Hanze; W. David Sartor; Beusse Wolter Sanks Mora + Maire, P.A.

(57) ABSTRACT

An operator control unit (OCU) (12) for a locomotive remote control system (10) for displaying information to an operator of the OCU for use in controlling operation of a locomotive (16) from a location off-board of the locomotive. The OCU includes a receiver (e.g., 22) receiving data indicative of a fault condition of a locomotive and a processor (24) processing the data to generate locomotive operational recommendation information responsive to the fault condition of locomotive. The OCU also includes an operator display (20) on the OCU showing information indicative of the locomotive operational recommendation information to allow an OCU operator to respond to the fault condition.

12 Claims, 1 Drawing Sheet

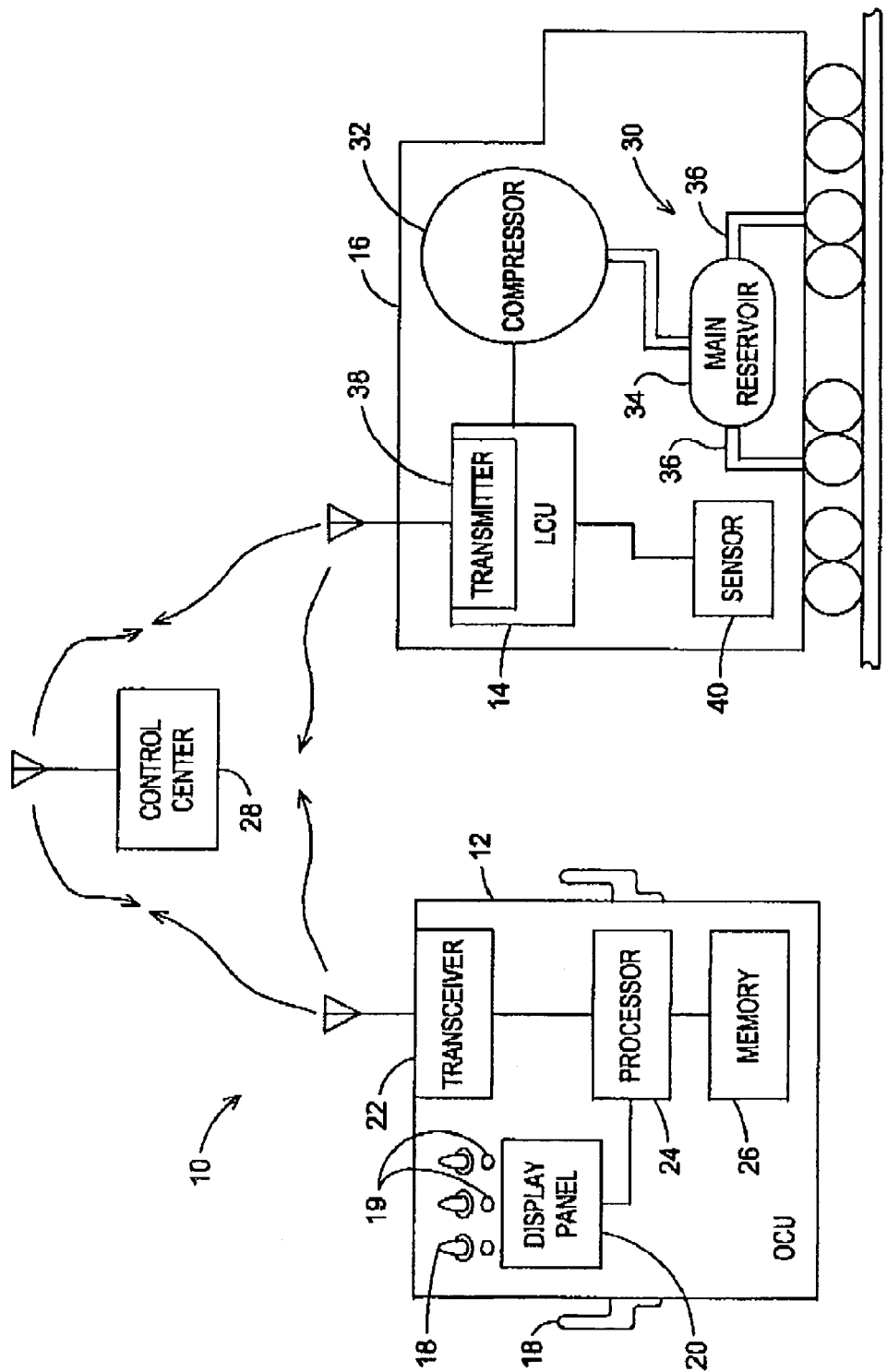

LOCOMOTIVE REMOTE CONTROL SYSTEM WITH DIAGNOSTIC DISPLAY

CROSS REFERENCE TO RELATED APPLICATIONS

This application claims priority to U.S. Provisional Application Ser. No. 60/555,113 filed on Mar. 22, 2004, and incorporated herein by reference.

FIELD OF THE INVENTION

This invention relates to the field of remote control of locomotives.

BACKGROUND OF THE INVENTION

It is known to remotely control locomotives in a switch-yard using remote radio transmitting devices controlled by rail yard personnel. Modern remote control systems allow yard operators to control driverless, microprocessor-equipped switching locomotives controlled by an on-board Locomotive Control Unit (LCU) using a battery-powered portable Operator Control Unit (OCU) to be carried by an operator located adjacent to, but off-board of the locomotive to be controlled. Two-way wireless communication is established between the OCU and the LCU. The operator controls the movement of the locomotive, while locomotive operating data and warnings are returned from the locomotive to the OCU. A limited amount of locomotive data, such as speed and brake system pressure, and warning code numbers may be displayed to the operator via a two-line text message display included in the OCU.

BRIEF DESCRIPTION OF THE DRAWINGS

The sole FIGURE is a schematic representation of an improved locomotive remote control system providing enhanced display of locomotive information.

DETAILED DESCRIPTION OF THE INVENTION

Prior art locomotive remote control systems have functioned as isolated devices that allowed an operator to control a locomotive remotely but that provided limited information to the operator of data parameters regarding remote operation of the locomotive. The present invention expands the capabilities of a locomotive remote control system to improve the operator's ability to function in the context of a rail yard. Productivity and safety of remote locomotive control operations may be enhanced by adding new data processing, communication and user interface capabilities, as described below.

An improved locomotive remote control system 10 is illustrated in the FIGURE as including an Operator Control Unit (OCU) 12 in wireless communication with a Locomotive Control Unit (LCU) 14 on-board a remotely controlled locomotive 16. The LCU 14 may include a transmitter 38 for transmitting locomotive information, such as a condition sensed by one or more sensors 40 to the OCU 12. The wireless link may further include communications with centralized control center 28. The OCU may include a transceiver 22 in communication with a processor 24. The processor 24 may access a memory 26 based on information transmitted, for example, from the locomotive 16 and received by the transceiver 22. In an embodiment, locomotive information may be received at the control center 28 and transmitted for the control centre toe the OCU. The OCU 12 includes various actuators 18, such as control levers, buttons, and switches, and indicators 19, such as lamps and LEDs, for operator interface. In addition, the OCU includes a display panel 20 for displaying information to an operator. The display panel 20 may be a GUI display, CRT, LCD display or other graphical display component known now in the art or developed in the future, for example of the type commonly used today on PDA devices. The display panel 20 may be an output device only, or it may be an input/output device such as a touch screen.

In an embodiment, the display panel 20 provides system operating messaging in an alphanumeric format. The display may be configured to display received locomotive and OCU status information such as warnings, alerts, and current condition of locomotive on-board systems. The display may also be configured to display trouble shooting information and fault condition recovery instructions based on a sensed error condition. For example, malfunctions of the locomotive 16 may be communicated to the OCU 12, and condition information for the locomotive may be displayed to the operator via the display panel 20. Sensors on-board the locomotive monitor parameters indicative of the condition of the locomotive. Such information is transmitted via the LCU 14 to the OCU 12 for display to the operator. In another embodiment, the information may be received at the control center 28 and then relayed to the OCU 12. The processor 24 receives the condition information and generates locomotive operational or service recommendations for display on the OCU 12.

Alternatively, the OCU 12 may receive such information from on-board diagnostic equipment. The information displayed may include a fault message and it may further include instructions to the operator for repairing/overcoming the malfunction. For example, based on a condition status received from the locomotive 16, the processor 24 may access a series of troubleshooting/and or fault recovery steps from a memory 26 for display to the operator. In an aspect of the invention, the fault message may include a general description of the type of fault, instead of merely displaying a fault code which an operator would need to interpret to understand the nature of fault. In other embodiments, the control center 28 and/or the locomotive 16 may be configured to determine appropriate troubleshooting/and or fault recovery steps based on the operating information. The appropriate troubleshooting and/or fault recovery steps may then be provided to the OCU 12 for display to an operator.

A series of repair actions may be associated with each possible fault code, such as may be accessed in a database stored in the control center 28, the OCU memory 26, or on-board the locomotive 16. When a malfunction occurs, the operator is guided through the repair actions via instructions displayed on the OCU 12. The operator may acknowledge actions and/or provide other types of feedback via the display panel 24 or via other means to further the diagnostic process, such as stepping though a troubleshooting tree or fault recovery steps. For example, during a fault condition, the operator may be notified to first engage an independent brake to acknowledge a displayed fault condition and then release the brake after performing fault recovery steps to notify the system 10 that the fault has been cleared. A fault tree sequence is thus accomplished with the purpose of correcting the malfunction. Alternatively, the operator may receive operational recommendations instructing the operator to take the locomotive out of service, and/or to move the locomotive to a siding or service facility to more effectively make the repairs and not to impede the operation of the railyard. The operating parameters and/or service and operational recommendation may also be transmitted to a display at the control center 28 for supervisory review. In yet another aspect, OCU information and corrective procedures may be provided via the display, such as a battery life indication or tilt indication directing the operator to move the OCU 12 to an upright position.

To enable an OCU operator to perform his tasks more efficiently, information may be displayed using a menuing format, that may further include timed or operator controlled scrolling of information in each of a selected menu category. For example, menu categories such as "OCU Status" and "Loco Status" may be provided and displayed according to a switch selection by the operator, such as by toggling a switch to scroll through the categories until a desired category is displayed. Once a desired category is displayed, a scrolling list of information associated with the category may be displayed. For example, under the "Loco Status" category, a scrolled list of information within this category may include brake pipe pressure, brake pipe flow, brake cylinder pressure, and main reservoir pressure to allow an operator to monitor a condition, such as a locomotive brake system is being charged, without having to board the locomotive to view these conditions. The scrolled list of information may be stopped by the operator at any one of the desired information items on the list. The desired item may be continually displayed and updated on a periodic basis and/or if the condition changes, so that the most current condition is displayed. For example, the scrolled list may be stopped on a brake pipe pressure information item to allow the operator to view and monitor a condition of the brake pipe pressure. A switch may be provided to allow the operator to stop scrolling at a desired item, continue scrolling after viewing a desired item, or to manually step through information items in a desired category.

Typically, the LCU 14 includes the capability to remotely control a locomotive brake system 30 that may include a brake air compressor 32, a main reservoir 34, and brake pipes 36. In a further aspect of the invention, a brake charging mode may be entered via the OCU 12, and the brake charge status shown on the display panel 20 during charging. For example, a train brake actuator switch on the OCU 12 may be configured to allow implementation of the brake charging mode when desired by the operator. After the charge mode is activated, the display panel 20 may show brake charging data, including brake pipe flow, brake pipe pressure, and main reservoir pressure in a scrolling format to allow the operator to monitor the brake charging process. During this process, the locomotive 16 may be commanded to increase a throttle setting to operate the brake air compressor 32 at a higher speed to pressurized the brake system 30. By monitoring the brake charging process, an operator can determine when a brake flow drops below a predetermined value, such as 60 cubic feet per minute (CFM), to ensure that there is sufficient air pressure in the brake system 30 to allow moving the locomotive safely.

In another aspect of the invention, the OCU 12 may tailor the information provided for display responsive to an operating mode of the locomotive. The OCU may determine an operating mode, for example, based on received operating parameters and/or locomotive control settings, and then displaying information appropriate for the operating mode. For example, when the locomotive 16 is determined to be stationary, such as when a speed of the locomotive is 0.0 mph and the brakes are applied, information important to stationary operation may be shown on the display panel 20. Such information may include brake pipe pressure, brake pipe flow, and other brake related conditions. When the locomotive 16 is determined to be in a traveling mode, speed information may be displayed and information such as brake pipe flow may be removed form the display. By limiting the information displayed to information appropriate for the operating mode, unnecessary cluttering of the display panel 20 with information that may be less critical for a certain operating mode may be achieved for improved operator control.

Based on the foregoing specification, the methods described may be implemented using computer programming or engineering techniques including computer software, firmware, hardware or any combination or subset thereof, wherein the technical effect is to provide an locomotive remote control system with a diagnostic display. Any such resulting program, having computer-readable code means, may be embodied or provided within one or more computer-readable media, thereby making a computer program product, i.e., an article of manufacture, according to the invention. The computer readable media may be, for instance, a fixed (hard) drive, diskette, optical disk, magnetic tape, semiconductor memory such as read-only memory (ROM), etc., or any transmitting/receiving medium such as the Internet or other communication network or link. The article of manufacture containing the computer code may be made and/or used by executing the code directly from one medium, by copying the code from one medium to another medium, or by transmitting the code over a network.

One skilled in the art of computer science will easily be able to combine the software created as described with appropriate general purpose or special purpose computer hardware, such as a microprocessor, to create a computer system or computer sub-system embodying the method of the invention. An apparatus for making, using or selling the invention may be one or more processing systems including, but not limited to, a central processing unit (CPU), memory, storage devices, communication links and devices, servers, I/O devices, or any sub-components of one or more processing systems, including software, firmware, hardware or any combination or subset thereof, which embody the invention.

While various embodiments of the present invention have been shown and described herein, it will be obvious that such embodiments are provided by way of example only. Numerous variations, changes and substitutions will occur to those of skill in the art without departing from the invention herein.

We claim:

1. An operator control unit (OCU) for a locomotive remote control system for displaying information to an operator of the OCU for use in controlling operation of a locomotive from a location off-board of the locomotive comprising:

an actuator for use in controlling an operation of the locomotive;

a receiver receiving data indicative of a fault condition of a locomotive;

a processor processing the data to generate locomotive operational recommendation information responsive to the fault condition of locomotive; and an operator display on the OCU showing information indicative of the locomotive operational recommendation information to allow an OCU operator to respond to the fault condition.

2. The OCU of claim 1, further comprising a memory storing system diagnostic and corresponding fault recovery routines responsive to fault conditions of the locomotive being accessible by the processor generate appropriate locomotive operational recommendation information.

3. A system for displaying information to an operator of a portable operator control unit (OCU) for use in controlling operation of a locomotive from a location off-board of the locomotive comprising:

an OCU off-board of the locomotive having a transceiver for wireless communications;

a locomotive control unit (LCU) responsive to the OCU to control a locomotive;

sensors on board the locomotive generating data indicative of conditions of the locomotive;

a transmitter transmitting the data from the locomotive; and a processor within the OCU for processing the data to generate locomotive operational recommendation information responsive to the conditions of locomotive; and a display on the OCU for displaying information from the processor to an operator.

4. The system of claim 3, wherein the OCU further comprises an actuator allowing the operator to selectively access information for display on the OCU.

5. The system of claim 3, further comprising a control center receiving the data from the locomotive and transmitting the data to the OCU.

6. The system of claim 3, wherein the data comprises locomotive health information.

7. The system of claim 6, wherein the data comprises troubleshooting information enabling the OCU to analyze the health data for correcting faults on the locomotive.

8. A method for displaying information to an operator of a portable operator control unit (OCU) for use in controlling operation of a locomotive from a location off-board of the locomotive comprising:

receiving information indicative of respective operating parameters of a locomotive at the OCU;

allowing the operator to selectively access information for display on the OCU from a menu of information available for display;

displaying the desired information selected by the operator; and wherein displaying the desired information further comprises sequentially scrolling the desired information on a display of the OCU.

9. The method of claim 8, wherein the desired information comprises locomotive brake charging data.

10. The method of claim 8, wherein the information is provided by the locomotive being controlled.

11. The method of claim 8, wherein the information is provided by a control center monitoring the operating parameters of the locomotive being controlled.

12. The method of claim 8, further comprising:

determining an operating mode of the locomotive; and tailoring the information being displayed responsive to the operating mode.

* * * * *